United States Patent
Sakurai et al.

[19]

[11] Patent Number: 5,866,077
[45] Date of Patent: Feb. 2, 1999

[54] STRUCTURE FOR SUPPORTING HONEYCOMB UNIT OF ELECTRICALLY-HEATED CATALYST APPARATUS

[75] Inventors: Kazuhiro Sakurai, Gotenba; Takuzou Kako, Tokai, both of Japan

[73] Assignees: Toyota Jidosha Kabushiki Kaisha; Nippon Steel Corp.

[21] Appl. No.: 795,224

[22] Filed: Feb. 5, 1997

[30] Foreign Application Priority Data

Feb. 6, 1996 [JP] Japan .................................... 8-019955
May 21, 1996 [JP] Japan .................................... 8-125842

[51] Int. Cl.⁶ ..................................................... F01N 3/10
[52] U.S. Cl. .......................... 422/174; 422/179; 422/180; 422/199; 422/221; 422/222; 60/300
[58] Field of Search ..................................... 422/173, 174, 422/180, 179, 199, 222, 171, 221; 60/300, 299; 29/890; 428/116, 593, 594

[56] References Cited

U.S. PATENT DOCUMENTS

| | | | |
|---|---|---|---|
| 5,149,508 | 9/1992 | Bullock | 422/180 |
| 5,169,604 | 12/1992 | Crothers, Jr. | 422/177 |
| 5,232,671 | 8/1993 | Brunson et al. | 422/174 |
| 5,323,608 | 6/1994 | Honma | 60/299 |

FOREIGN PATENT DOCUMENTS

| | | |
|---|---|---|
| 0553942 | 8/1993 | European Pat. Off. . |
| 0558064 | 9/1993 | European Pat. Off. . |
| 0604868 | 7/1994 | European Pat. Off. . |
| 5269389A | 10/1993 | Japan . |
| 7131598 | 5/1995 | Japan . |
| 7224645A | 8/1995 | Japan . |
| 855963 | 3/1996 | Japan . |
| 857521 | 3/1996 | Japan . |
| WO 9638657 | 12/1995 | WIPO . |

*Primary Examiner*—Hien Tran
*Attorney, Agent, or Firm*—Kenyon & Kenyon

[57] ABSTRACT

A honeycomb support structure of an electrically-heated catalyst apparatus is disclosed, in which a support member of retainers for preventing an electrically-heated catalyst moving backward is coupled to an outer cylinder while causing the support member to follow the thermal deformation of the outer cylinder thereby to suppress the deformation of the support member due to the thermal stress. A metal foil laminate having a corrugated foil and a tabular foil superposed one on the other is spirally wound to form a cylindrical honeycomb unit, which is accommodated in a metal outer cylinder and is heated by being supplied with power. The honeycomb unit support structure includes a plurality of ceramic bars and at least a support member having a plurality of recesses for holding the ceramic bars at such a position as to traverse the end surface of the honeycomb unit downstream of the exhaust gas flow and in such a manner as to follow the deformation of the outer cylinder. The structure of the support member that can follow the deformation can be realized by preparing a cylindrical metal plate and forming at least a gap in the cylindrical metal plate. Consequently, the honeycomb unit is prevented from telescoping, a uniform temperature distribution in the support member is assured, and the durability of the support member is improved.

9 Claims, 14 Drawing Sheets

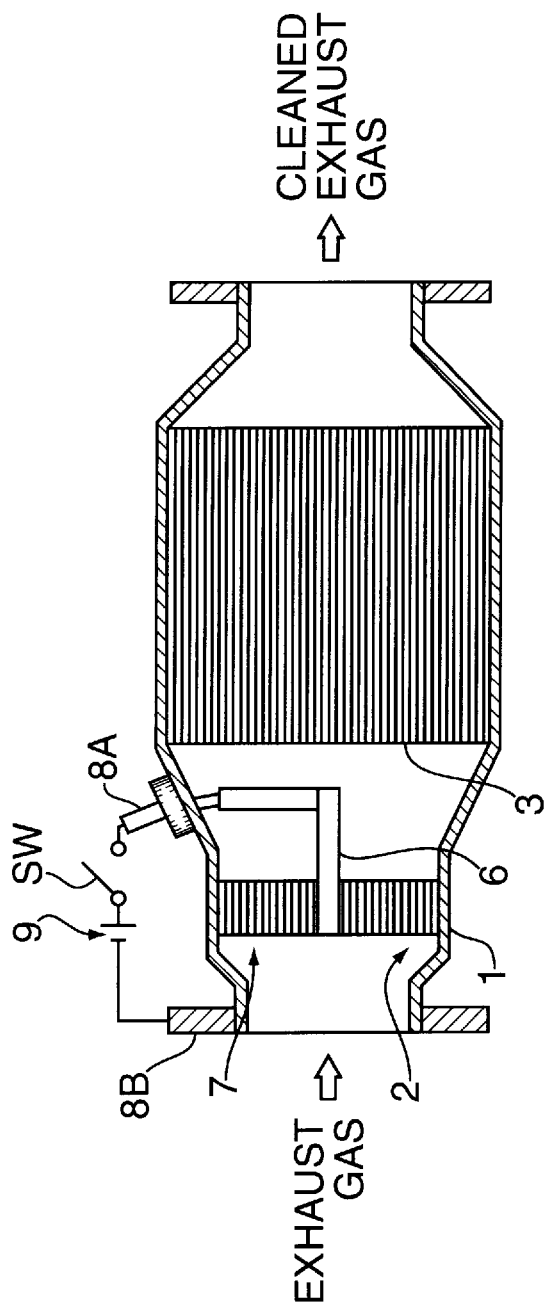

STRUCTURE FOR SUPPORTING HONEYCOMB UNIT OF ELECTRICALLY-HEATED CATALYST APPARATUS

BACKGROUND OF THE INVENTION

1. Field of the Invention

The present invention relates to a honeycomb unit support structure for an electrically-heated catalyst apparatus, and more in particular to a metal honeycomb unit support structure constituting a catalyst carrier of an electrically-heated catalyst apparatus which can be supplied with power and heated to a catalyst activation temperature within a short time.

2. Description of the Related Art

The exhaust gas emitted from the internal combustion engine mounted on an automotive vehicle contains hazardous materials such as HC (hydrocarbon), CO (carbon monoxide) and NOx (nitrogen oxides). The exhaust manifold of the internal combustion engine, therefore, is generally provided with a catalyst converter as an exhaust gas cleaning unit for cleaning the exhaust gas. The three-way catalyst used for the catalyst converter, however, is known to have a low rate of cleaning hazardous materials in the exhaust gas when the catalyst temperature is low (is in an inactive state). The exhaust gas cannot be cleaned sufficiently, therefore, as long as the catalyst is inactive after cold starting of the internal combustion engine.

In view of this, an electrically-heated catalyst apparatus has been suggested in which a catalyst carrier made of a metal is supplied with electrical power at the time of starting the engine or when the catalyst is inactive, so that the metal catalyst carrier is heated up to a catalyst activation temperature (300° to 400° C.) within a short time.

The electrically-heated catalyst apparatus comprises a cylindrical casing connected to the exhaust manifold of the internal combustion engine, and a main catalyst carrier and an electrically-heated catalyst carrier serially arranged in spaced relation to each other in the cylindrical casing. The electrically-heated catalyst carrier is heated by power supplied thereto and includes a central electrode which is led out of the casing through an electrode section. A battery and a switch are connected between the electrode section and an external electrode provided on a part of the casing. When the switch is turned on, the electrically-heated catalyst carrier is supplied with power thereby to generate heat.

The electrically-heated catalyst carrier is generally made by superposing a corrugated metal foil (hereinafter called "the corrugated foil") and a tabular metal foil (hereinafter called "the tabular foil") on each other, coupling the longitudinal ends thereof to the center electrode, and then winding the superposed structure of the corrugated foil and the tabular foil around the central electrode thereby to constitute a spiral metal foil laminate (honeycomb unit). A foil member about 50 μm thick made of an iron alloy containing aluminum is generally used for the corrugated foil or the tabular foil.

The honeycomb unit 7 made by winding the corrugated foil and the tabular foil around the central electrode has an axial path formed spirally around the central electrode by the space between the corrugated foil and the tabular foil. Also, an exhaust gas cleaning catalyst is carried on the surface of the corrugated foil and the tabular foil. When the switch is turned on for supplying power to the honeycomb unit and the exhaust gas is caused to flow through the path while the temperature of the catalyst is increased for activation, the hazardous components of the exhaust gas are brought into contact with the catalyst and the exhaust gas is cleaned.

The electrically-heated catalyst apparatus configured in this way has the disadvantage that the corrugated foil and the tabular foil of the honeycomb unit are liable to be displaced from each other (hereinafter referred to as "telescoping") or are liable to break down due to such adverse factors as the high-temperature, high-speed exhaust gas flowing in the exhaust manifold, the heat cycle in which the engine is heated when running and cooled when stationary, and vibrations exerted from the engine or the vehicle body, thereby often leading to a reduced function of the electrically-heated catalyst carrier.

The following solutions to these problems have been proposed:

(1) The end surface of the honeycomb unit of the electrically-heated catalyst apparatus downstream of the exhaust gas flow is supported in contact with at least a support bar (retainer) covered with an insulating material, and the retainer is welded to a metal outside cylinder (case) (see JP-A-5-269389).

(2) A joint reinforcement is formed on each of the inner periphery and the outer periphery of the honeycomb unit of the electrically-heated catalyst apparatus, an insulative ceramics bar is suspended as a retainer over the inner peripheral reinforcement and the outer peripheral reinforcement downstream of the exhaust gas flow for preventing the catalyst carrier moving backward, and each retainer is fixed by a support member thereby to prevent telescoping (foil displacement) of the electrically-heated catalyst carrier.

(3) The contact portion between the corrugated foil and the tabular foil in the neighborhood of each of the outer and inner peripheries of the honeycomb unit is coupled by welding with a Ni solder or the like, and a reinforcement thus is provided on each of the outer and inner peripheries of the honeycomb unit.

The preventive means first-above described, however, poses the problem that the honeycomb unit portion free of the retainer suffers telescoping. The second preventive means, on the other hand, if the support members are mounted inappropriately, develops an uneven temperature distribution on the outer cylinder and deforms the support members, often causing the retainers to come off from the support members.

Further, the problem of the third preventive means is that telescoping occurs in the boundary between the reinforced outer peripheral portion and the remaining portions of the honeycomb unit. Telescoping also occurs in similar fashion in the neighborhood of the boundary between the honeycomb unit having no inner or outer peripheral reinforcement and the case containing the honeycomb unit.

SUMMARY OF THE INVENTION

An object of the present invention is to provide a support structure of an electrically-heated catalyst apparatus in which the telescoping of the electrically-heated catalyst carrier is prevented and the support members for holding the retainers for preventing the recession of the electrically-heated catalyst are coupled to the outer cylinder in such a manner as to suppress the deformation of the support members under thermal stress and thus to prevent the retainers from coming off.

Another object of the invention is to provide a lightweight and low-cost support structure of an electrically-heated catalyst apparatus in which retainers of an insulating material and support members thereof are arranged only in the weakest portion of the honeycomb unit to prevent the telescoping while at the same time reducing the retainers and the support members to a required minimum number.

According to a first aspect of the invention, there is provided a honeycomb unit support structure of an electrically-heated catalyst apparatus comprising a plurality of insulative retainers capable of preventing the telescoping over a wide area of the honeycomb unit. Further, the support members, when coupled to the outer cylinder, can follow the deformation of the outer cylinder and therefore can be kept in close contact substantially uniformly with the inner peripheral surface of the outer cylinder. As a consequence, heat is propagated to the outer cylinder uniformly, thereby leading to uniform temperature distribution between the outer cylinder and the support members. Thus the deformation of the support members due to the effect of thermal stress is prevented.

According to a second aspect of the invention, there is provided a support structure comprising a support member formed of a partially discontinuous metal cylinder, has the advantage that the support members can be easily assembled on the outer cylinder.

According to a third aspect of the invention, there is provided a support structure comprising two separate support members, has the advantage that each support member can be easily relieved after being molded, thereby facilitating the production of the support members.

According to a fourth aspect of the invention, there is provided a support structure, in which the honeycomb unit includes a plurality of heat-generating joints formed spirally toward the center point of the honeycomb unit from the outer periphery of the honeycomb unit, and the retainers are arranged on the side of the honeycomb far from the heat-generating joint located at the outermost periphery of the honeycomb unit with respect to the center point thereof. Therefore, the telescoping can be prevented with the minimum number of the retainers and the support members for a lower weight and a lower cost.

BRIEF DESCRIPTION OF THE DRAWINGS

The present invention will be more clearly understood from the description as set forth below with reference to the accompanying drawings, wherein:

FIG. 1 is a cross sectional view for explaining an example structure of a conventional electrically-heated catalyst apparatus;

DESCRIPTION OF THE PREFERRED EMBODIMENTS

Figure 2A:
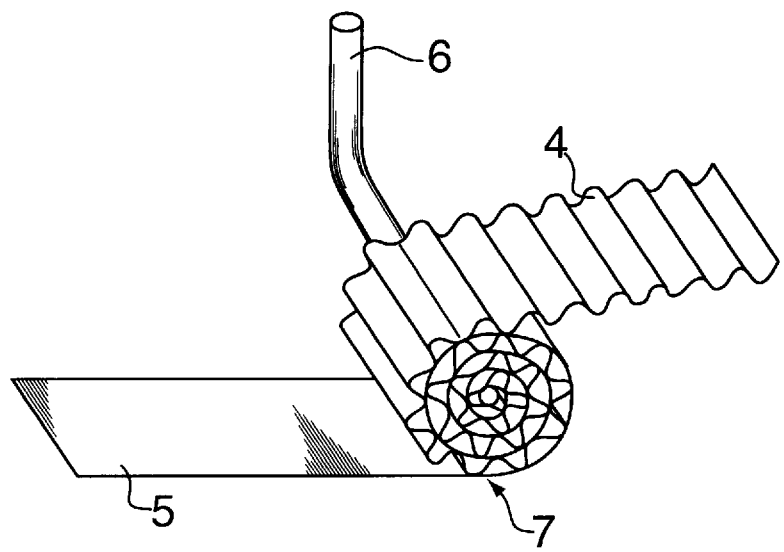
FIG. 2A is a diagram for explaining a method of forming a well-known honeycomb unit.

Before describing the preferred embodiments, an explanation will be given of the conventional electrically-heated catalyst apparatus shown in FIGS. 1 to 4B.

A conventional electrically-heated catalyst apparatus, as shown in FIG. 1, comprises a cylindrical casing 1 connected to the exhaust manifold of the internal combustion engine and a main catalyst carrier 3 and an electrically-heated catalyst carrier 2 serially disposed in spaced relation to each other in the casing 1 and supplied with power to generate heat. The electrically-heated catalyst carrier 2 has a central electrode 6 which is led out of the casing 1 through an electrode section 8A. A battery 9 and a switch SW are interposed between the electrode section 8A and an external electrode 8B disposed on a part of the casing 1. When the switch SW is turned on, the electrically-heated catalyst carrier 2 is supplied with power and heated.

The electrically-heated catalyst carrier 2, as shown in FIG. 2A, is configured of a honeycomb unit 7 having a spiral structure including a corrugated foil 4 and a tabular foil 5 superposed one on the other with the longitudinal ends thereof coupled to the central electrode 6, and the corrugated foil 4 and the tabular foil 5 thus superposed are wound around the central electrode 6 and fastened. The corrugated foil 4 and the tabular foil 5 are generally composed of a foil material of an iron alloy (20% Cr - 5% Al - 75% Fe, for example) or the like containing aluminum and having a thickness of about 50 μm.

Figure 2B:
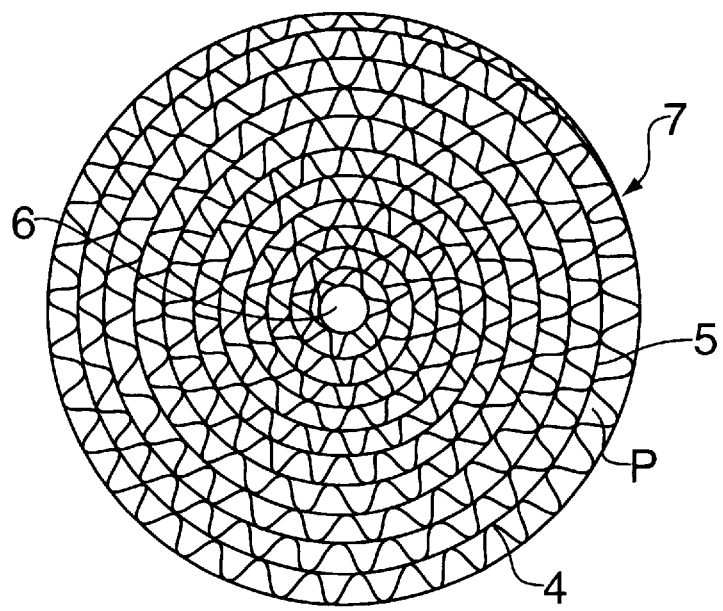
FIG. 2B is a side view schematically showing one end of the honeycomb unit wound as shown in FIG. 2A.

FIG. 2B shows an end surface of the honeycomb unit 7 configured of a metal corrugated foil 4 and a metal tabular foil 5. The corrugated foil 4 and the tabular foil 5 are superposed one on the other and wound around the central electrode 6. The honeycomb unit 7, therefore, has a plurality of paths P formed in axial direction by the space between the corrugated foil 4 and the tabular foil 5 and spirally arranged around the electrode 6. Also, the surface of the corrugated foil 4 and the tabular foil 5 carries an exhaust gas cleaning catalyst. Consequently, with the switch SW turned on and the honeycomb unit 7 increased to a catalyst activation temperature, the exhaust gas flows through the paths P so that the hazardous components of the exhaust gas come into contact with the catalyst thereby to clean the exhaust gas.

In the electrically-heated catalyst apparatus configured as mentioned above, telescoping (foil displacement) may develop between the corrugated foil 4 and the tabular foil 5 of the honeycomb unit 7 or the foils may be broken and the function thereof may deteriorate as an electrically-heated catalyst carrier due to the high-temperature, high-speed exhaust gas flowing in the exhaust manifold, the heat cycle of the engine heated while running and cooled in stationary state, and the vibrations transmitted from the engine or the vehicle body.

As a preventive means against these problems, JP-A-5-269389 proposes an electrically-heated catalyst in which an end surface of the honeycomb unit downstream of the exhaust gas flow is supported in contact with at least a support bar (retainer) covered with an insulating material, and the retainer is welded to a metal outer cylinder (case). Also, there has been proposed an electrically-heated catalyst apparatus formed of a joint reinforcement layer on each of the inner periphery and the outer periphery of the honeycomb unit, in which at least a ceramic bar of an insulating material is suspended as a retainer on the inner peripheral reinforcement layer and the outer peripheral reinforcement layer downstream of the exhaust gas flow for preventing the recession of the catalyst carrier, and each retainer is fixed by a support member, thereby preventing telescoping of the electrically-heated catalyst carrier.

Figure 3:
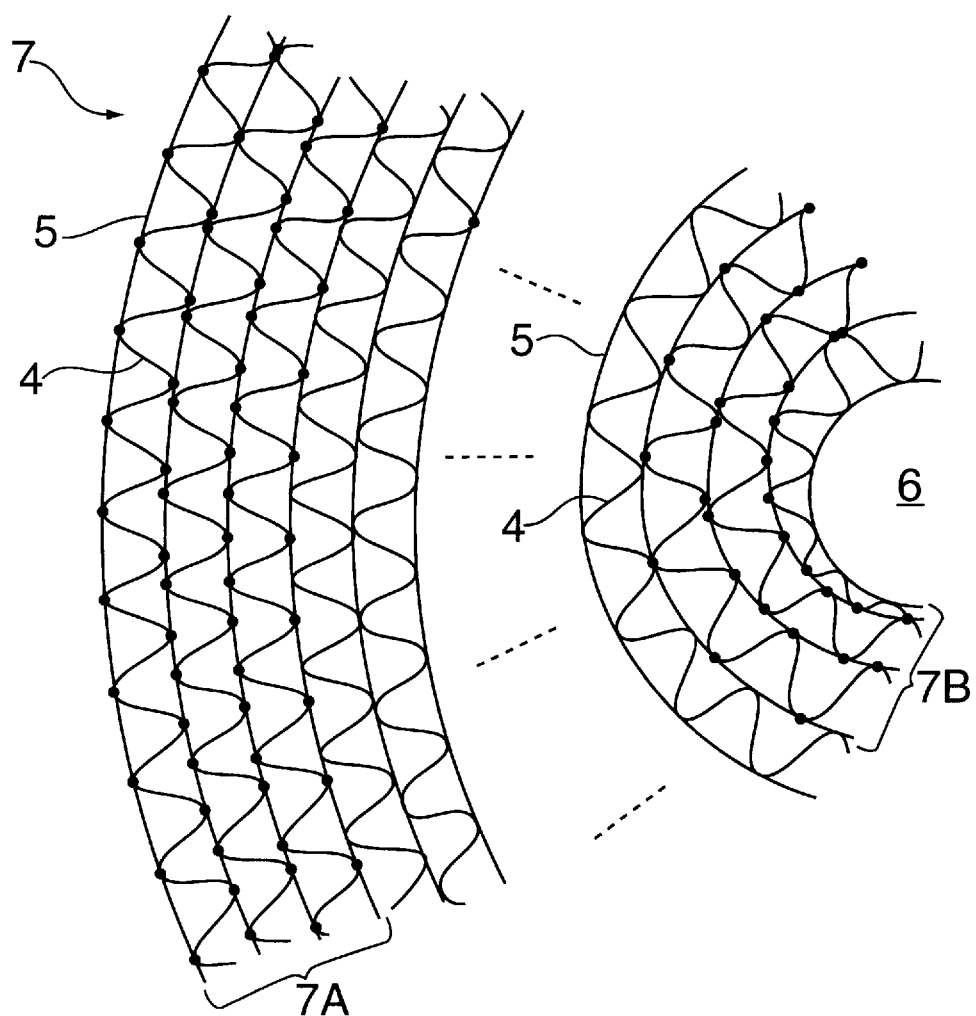
FIG. 3 is a partly enlarged view of reinforcements disposed on the outer periphery and the inner periphery of the honeycomb unit shown in FIG. 2B.
Figure 4A:
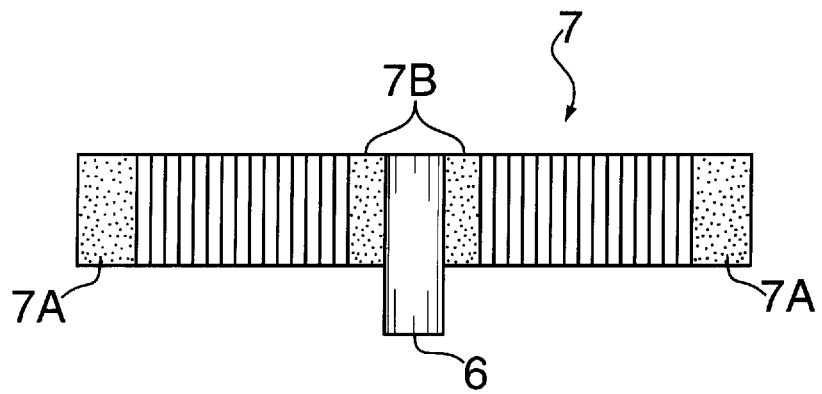
FIG. 4A is a sectional view of the honeycomb unit having reinforcements formed on the outer periphery and the inner periphery as shown in FIG. 3.

Another preventive means has been suggested as shown in FIG. 3, in which the contact points between the corrugated foil and the tabular foil 5 in the neighborhood of the outer periphery of the honeycomb unit 7 and the contact points between the corrugated foil 4 and the tabular foil 5 in the neighborhood of the inner periphery of the honeycomb unit 7 are coupled (the joints indicated by solid black circles) to each other by welding with a Ni solder material or the like. In addition, as shown in FIG. 4A, reinforcements 7A, 7B (indicated by dots) are formed on the outer periphery and the inner periphery, respectively, of the honeycomb unit 7.

The electrically-heated catalyst apparatus proposed in JP-A-5-269389, in which retainers are provided in such positions as to traverse the central portion of the honeycomb unit, poses the problem that telescoping develops in the honeycomb unit portion free of the retainers. A structure has also been suggested in which ceramic bars of an insulating material are suspended as retainers over the joint reinforcement layers on the inner periphery and the outer periphery of the honeycomb unit, and the retainer support members are assembled by welding or the like means on the outer cylinder. In this structure, however, the space between each support member and the outer cylinder is liable to lack uniformity over the entire circumference of the outer cylinder, thereby biasing the support member with respect to the outer cylinder. Consequently, some support members are in contact with the outer cylinder while other support members are not, with the result that the support members are unable to propagate the exhaust gas heat uniformly to the outer cylinder, thereby leading to an uneven temperature distribution. Thus, the support members are liable to be deformed under the effect of thermal stress attributable to the uneven temperature distribution. In the case where the deformation of the support members is considerable, the retainers may come off from the support members.

Figure 4B:
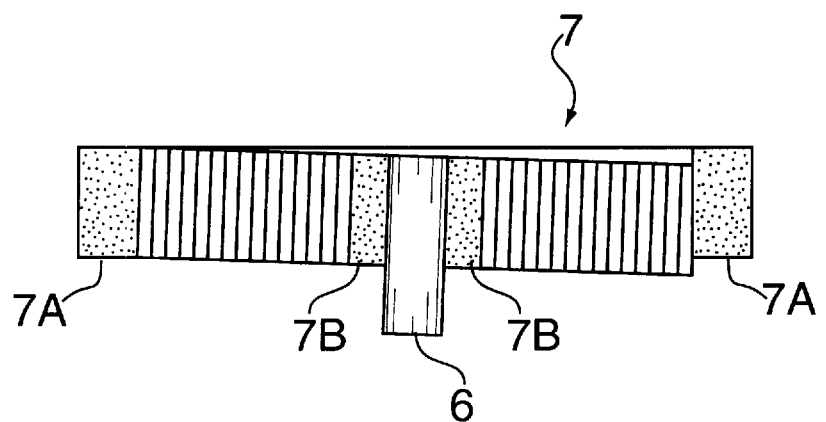
FIG. 4B is a diagram for explaining the problem points of the honeycomb unit shown in FIG. 4A.

In the structure for preventing telescoping with the reinforcements 7A, 7B formed on the outer periphery and the inner periphery of the honeycomb unit 7, on the other hand, as shown in FIG. 4B, telescoping (foil displacement) occurs in the boundary between the outer peripheral reinforcement 7A and other parts of the honeycomb unit 7. Also with the honeycomb unit 7 lacking the reinforcements 7A, 7B on the outer periphery and the inner periphery thereof, telescoping develops similarly in the neighborhood of the boundary between the honeycomb unit 7 and the casing or the like containing the honeycomb unit 7.

Now, embodiments of the present invention will be explained in detail. Those component parts are identical to the corresponding ones included in the electrically-heated catalyst apparatus described with reference to FIGS. 1 to 4B above are designated by the same reference numerals, respectively.

Figure 5A:
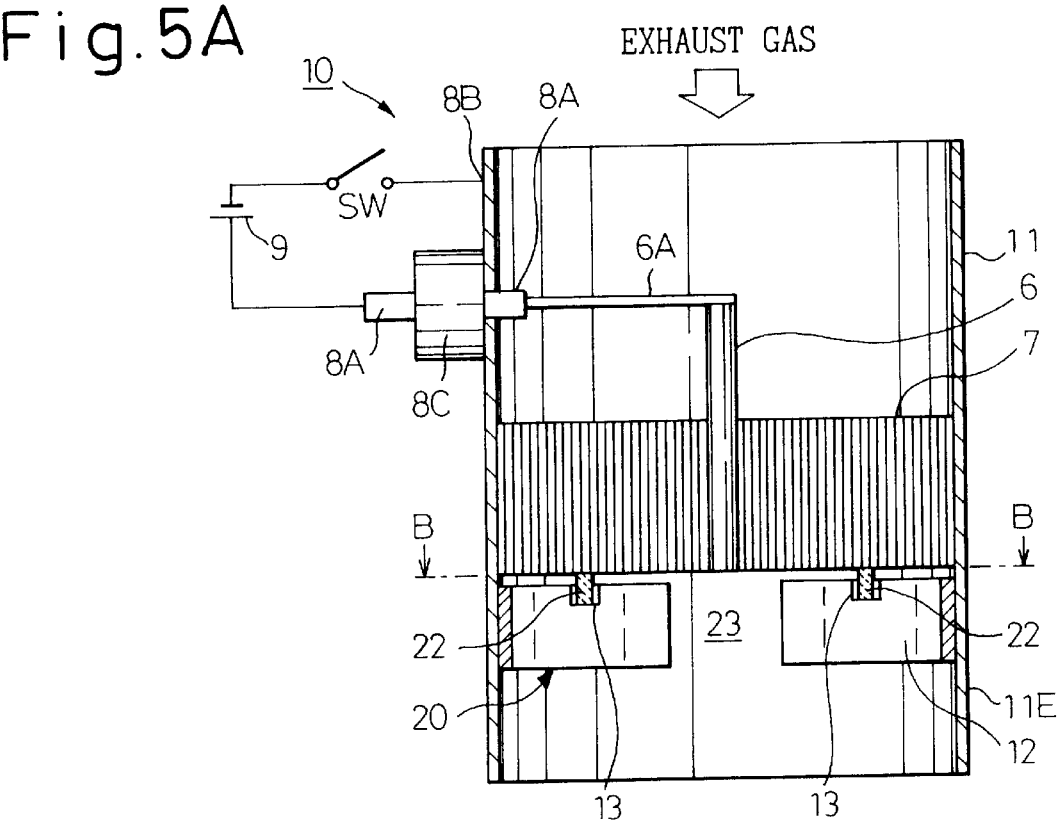
FIG. 5A is a sectional view showing a configuration of an electrically-heated catalyst apparatus according to a first embodiment of the invention.
Figure 5B:
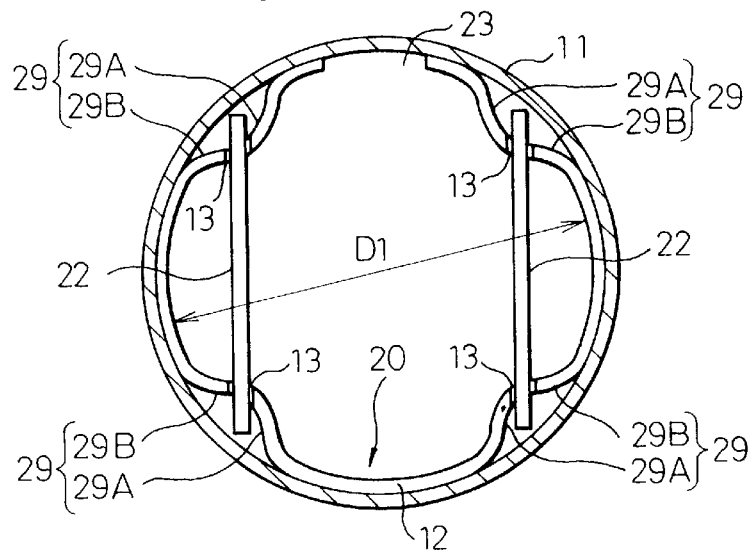
FIG. 5B is a sectional view taken in line B—B in FIG. 5A.

FIG. 5A is a side sectional view showing a configuration of an electrically-heated catalyst apparatus 10 according to a first embodiment of the invention, and FIG. 5B is a horizontal sectional view taken in line B—B in FIG. 5A.

As shown in FIGS. 5A, 5B, numeral 11 designates a metal outer cylinder of the electrically-heated catalyst apparatus 10. A honeycomb unit 7 composed of a corrugated foil 4 and a tabular foil 5 described with reference to FIG. 2A is inserted in the outer cylinder 11. A central electrode 6 is disposed at the central portion of the honeycomb unit 7. The central electrode 6 is connected by means of a lead section 6A to an electrode section 8A formed through a holder 8C on the outer peripheral surface of the outer cylinder 11. A battery 9 and a switch SW are interposed between the electrode section 8A and an external electrode 8B disposed at a predetermined point on the outer cylinder 11. The honeycomb unit 7 composed of the corrugated foil 4 and the tabular foil 5 is housed in the outer cylinder 11 as shown in FIG. 6.

The outer cylinder 11, on the other hand, extends downstream of the honeycomb unit 7 in the exhaust gas flow. The extension 11E has mounted thereon ceramic bars 22 as retainers of the honeycomb unit 7 and a support member 20. According to this embodiment, as shown in FIGS. 5A, 5B and 6, two parallelopipedal ceramics bars 22 having a longitudinal rectangular section are arranged in such positions as to traverse the end surface of the honeycomb unit 7 downstream of the exhaust gas flow.

Figure 6:
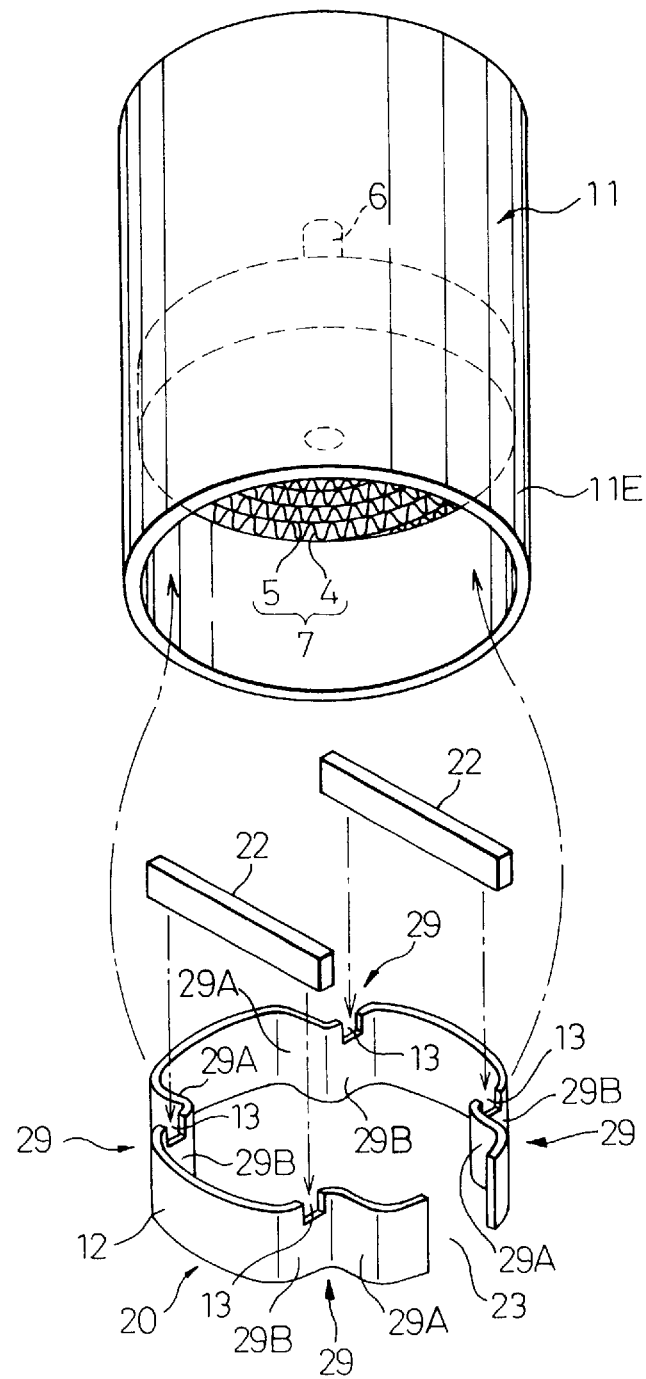
FIG. 6 is a perspective view for explaining the process of assembling the electrically-heated catalyst apparatus shown in FIGS. 5A, 5B.

The support member 20, as shown in FIGS. 5A, 5B and 6, is configured of a cylinder 12 of a thin metal. The outer diameter of the metal cylinder 12 has such a length as to contact the inner diameter of the outer cylinder 11. The outer peripheral surface of the metal cylinder 12 is formed with four supports 29 recessed by press work. Each support 29 has two side walls 29A, 29B, and a slot 13 for resting a ceramics bar 22 is formed in the opposed side walls 29A, 29B of adjacent supporters 29. The opposed resting slots 13 are arranged on a straight line and have the same depth and width. The two ceramic bars 22 each suspended over the two resting slots 13 are parallel to each other. The length of the two ceramic bars 22 as suspended over the two resting slots 13 is such as to not reach the inner peripheral surface of the outer cylinder 11.

Further, the outer peripheral section of the support member 20 has a gap 23 formed in one of the portions thereof between the two parallel ceramic bars 22. This gap 23 makes it possible to increase or decrease the inner diameter D1 of the support member 20 shown in FIG. 5B.

In forming the electrically-heated catalyst apparatus 10 shown in FIGS. 5A, 5B, the honeycomb unit 7 is housed in the outer cylinder 11 first of all, and then the support member 20 with the ceramic bars 22 suspended between the housing slots 13 is inserted into the outer cylinder 11 by way of an opening formed in the extension 11E of the cylinder 11 as shown in FIG. 6. In the process, the support member 20, with its inner diameter reduced, can be readily inserted into the outer cylinder 11. As the ceramic bars 22 come into contact with the end surface of the honeycomb unit 7, the support member 20 stops moving. Under this condition, the support member 20 is fixed on the outer cylinder 11 by spot welding or the like. The ceramic bars 22 thus function as retainers held by the support member 20 for preventing the telescoping of the honeycomb unit 7.

In the process of coupling the support member 20 to the inner peripheral surface of the outer cylinder 11, the portion of the support member 20 farthest from the gap 23 is first coupled by welding to the inner peripheral surface of the outer cylinder 11, and then the welding proceeds toward the ends of the support member 20. As an alternative method, an end of the support member 20 nearest to the gap 23 is first coupled by welding, and then the welding proceeds toward the opposite end of the support member 20.

In the electrically-heated catalyst apparatus 10 having the above-mentioned configuration, the support member 20 is coupled to the inner peripheral surface of the outer cylinder 11 in such a manner that the support member 20 comes into close contact along the entire inner peripheral surface of the outer cylinder 11 due to the presence of the gap 23 of the support member 20. As a result, heat is transferred uniformly from the support member 20 to the outer cylinder 1, so that no uneven temperature distribution occurs in the support member 20.

Also, since the ceramic bars 22 providing retainers are rested in the slots 13 of the supporters 29 of the support member 20, the holding margin of the ceramic bars 22 is increased. The ceramic bars 22, therefore, are unlikely to come off in case of a slight deformation of the support member 20. The ceramic bars 22 thus retain the function as retainers for preventing the telescoping of the honeycomb unit 7.

Further, the ceramic bars 22 are formed shorter than the length of the chord containing the resting slots 13 between the opposed portions of the outer cylinder 11. As a result, the difference in thermal contraction between the outer cylinder 11 and the ceramic bars 22 does not cause the ceramic bars 22 to be compressed at low temperatures, thereby making it possible to prevent compressive breakdown of the ceramic bars 22.

The support member 20, even with a large error in diameter or circumferential length, is deformed in close contact along the inner peripheral surface of the outer cylinder 11 due to the gap 23, and therefore, can be easily fabricated at a lower cost.

Figure 7A:
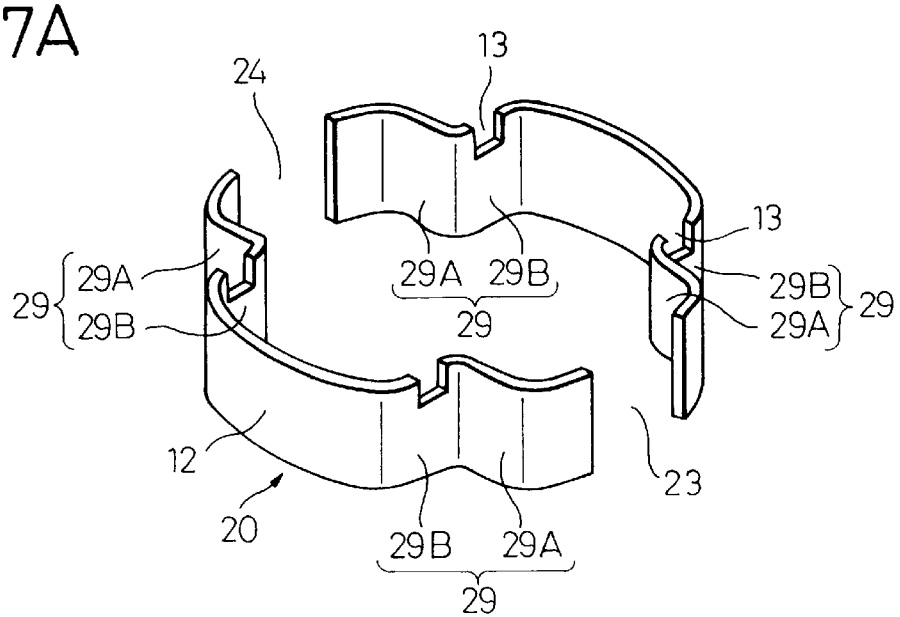
FIG. 7A is a perspective view showing a configuration of support members of an electrically-heated catalyst apparatus according to a second embodiment of the invention.
Figure 7B:
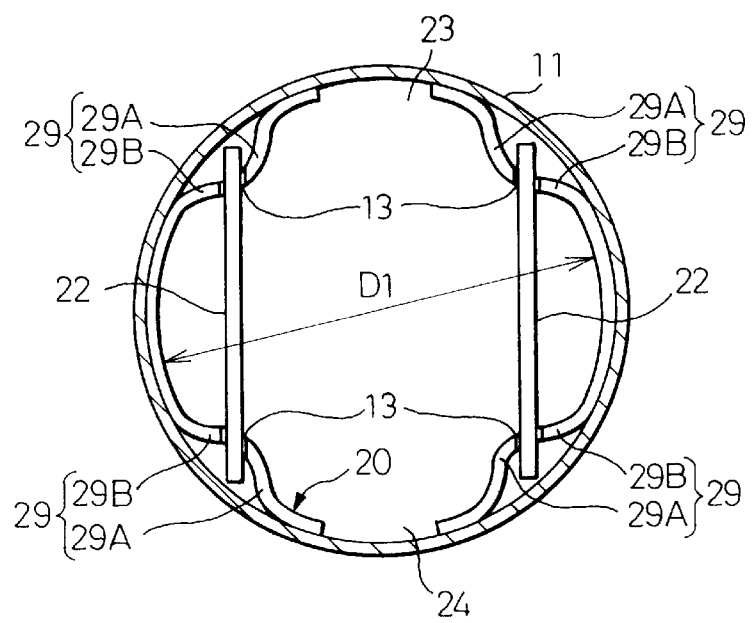
FIG. 7B is a sectional view showing the same portion as FIG. 5B of the electrically-heated catalyst apparatus according to the second embodiment.

FIG. 7A is a perspective view showing a configuration of the support member 20 of an electrically-heated catalyst apparatus according to a second embodiment of the invention. FIG. 7B is a sectional view of the portion identical to FIG. 5B showing the electrically-heated catalyst apparatus 10 according to the first embodiment. The side sectional view of the electrically-heated catalyst apparatus according to the second embodiment is exactly the same as the side sectional view of FIG. 5A showing the electrically-heated catalyst apparatus 10 according to the first embodiment, and therefore will not be illustrated.

The electrically-heated catalyst apparatus according to the second embodiment is different from the electrically-heated catalyst apparatus 10 according to the first embodiment only in the shape of the support member 20. In the following description of the electrically-heated catalyst apparatus according to the second embodiment, therefore, the same component parts as those in the electrically-heated catalyst apparatus 10 according to the first embodiment will be designated by the same reference numerals, respectively, and will not be described.

The support member 20 according to the second embodiment, as shown in FIGS. 7A, 7B, is formed with a second gap 24 cut in the same manner as the first gap 23 according to the first embodiment shown in FIG. 6 in the portion thereof opposed to the gap 23. The position and shape of the supporters 29 and the shape of each resting slot 13 of the ceramics bar 22 formed in each supporter 29 are exactly identical to those of the first embodiment, respectively.

In forming an electrically-heated catalyst apparatus according to the second embodiment, as in the first embodiment, the honeycomb unit 7 is first accommodated in the outer cylinder 11, and then the two support members 20 with the ceramics bars 22 suspended between the resting slots 13 are inserted into the outer cylinder 11 by way of an opening formed in the extension 11E of the outer cylinder 11 in such a manner that the gaps 23, 24 are of the same length. The two support members 20 can be readily inserted into the outer cylinder 11 as the distance between the two ends of the support member 20 is shortened in the process. With the ceramic bars 22 coming into contact with the end of the honeycomb unit 7, the insertion of the support members 20 stops. Under this condition, the support members 20 are fixed by spot welding or the like in the outer cylinder 11. The ceramics bars 22 thus function as retainers of the honeycomb unit 7, which retainers are held by the support members 20. As a result, the telescoping of the honeycomb unit 7 is prevented.

In coupling the two support members 20 to the inner peripheral surface of the outer cylinder 11, the portion (central portion) of each support member 20 farthest from the ends thereof is first coupled by welding to the inner peripheral surface of the outer cylinder 11. Then, the welding proceeds toward the ends of the support member 20. As an alternative method, one end of the support member 20 is first coupled by welding, and then the welding proceeds toward the other end of the support member 20. This coupling process causes the support members 20 to be deformed along and brought into close contact over the entire inner peripheral surface of the outer cylinder 11, and the resulting uniform space makes it possible to transmit heat uniformly from the support members 20 to the outer cylinder 11.

In the electrically-heated catalyst apparatus according to the second embodiment configured as described above, the two support members 20 separated by the gaps 23, 24 are coupled in close contact along the entire inner peripheral surface of the outer cylinder 11. As a consequence, heat is transferred uniformly from the support members 20 to the outer cylinder 11, thereby preventing the uneven temperature distribution in the support member 20.

The electrically-heated catalyst apparatus 10 according to the second embodiment has the same advantages as the electrically-heated catalyst apparatus 10 according to the first embodiment in that the ceramic bars 22 constituting retainers are not liable to come off and the telescoping is prevented even with a considerable deformation of the support member 20, in that the compressive breakdown of the ceramic bars 22 is prevented which otherwise might be caused by the difference in thermal contraction between the outer cylinder 11 and the ceramic bars 22 at low temperatures, and in that since the support member 20 is kept in close contact along the entire inner peripheral surface of the outer cylinder 11, the electrically-heated catalyst apparatus can be readily fabricated at a lower cost even with a large error in diameter or circumferential length of the support member 20.

The electrically-heated catalyst apparatus 10 according to the first embodiment described above is fabricated by placing an inner die with recesses at the portions thereof corresponding to the supporters 29 inside the support member 20 in the form of cylindrical metal and pressing it from outside in an outer die with protrusions at the portions thereof corresponding to the supporters 29. Alternatively, the electrically-heated catalyst apparatus 10 according to the first embodiment can be made using a continuous molding process as described below.

Figure 8:
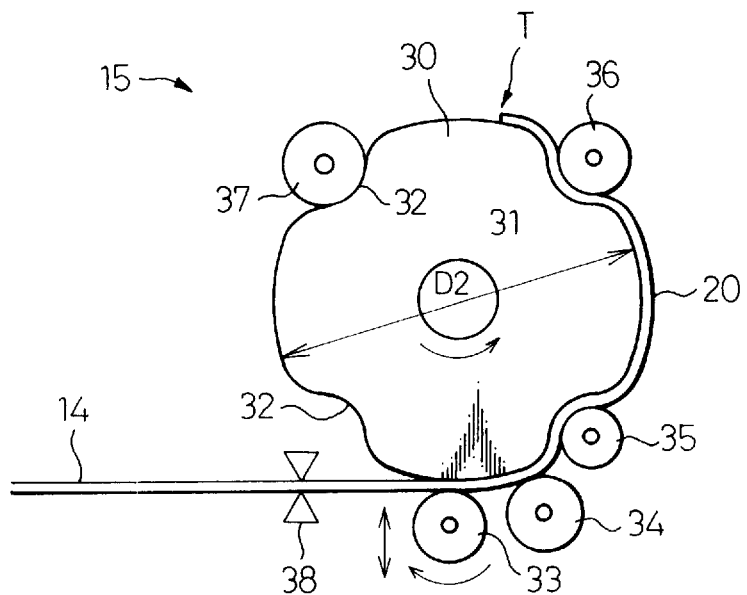
FIG. 8 is a diagram for explaining an example process of fabricating the support members described with reference to FIGS. 5A, 5B and 6.

FIG. 8 is a diagram for explaining a general configuration of a continuous molding unit 15 according to an embodiment for fabricating the support member 20 described in FIGS. 5A, 5B and 6. In FIG. 8, numeral 30 designates a inner die rotor mounted on a rotative shaft 31. The inner die rotor 30 has a diameter D2 substantially equal to the inner diameter D1 of the support member 20 described with reference to FIGS. 5A, 5B. Recesses 32 of the same dimensions and the same shape as those of the inner surface of the supporter 29 are formed at positions corresponding to the supporters 29 of the support member 20 explained with reference to FIGS. 5A, 5B on the outer periphery of the inner die rotor 30. The recesses 32 are smoothly connected to the outer peripheral portion of the inner die rotor 30.

Also, according to this embodiment, five outer die rotors 33, 34, 35, 36, 37 are disposed on the outer peripheral surface of the inner die rotor 30. These outer die rotors 33, 34, 35, 36, 37 have the rotative shafts thereof configured movably in radial direction away from the inner die rotor 30 on the one hand and urged toward the rotative shaft 31 of the inner die rotor 30 and thus are kept in close contact with the outer peripheral portion of the inner die rotor 30 under a predetermined pressure on the other hand. The rotors 33 to 37 are formed with such a diameter as to be smoothly rotated over the recesses of the metal plate 14 deformed along the recesses 32 of the inner die rotor 30.

The outer die rotors 33, 34, 35 in particular are for molding and the outer die rotors 36, 37 are for holding. Consequently, the outer die rotors 33, 34, 35 are concentrated at the portion where the thin metal plate 14 is inserted, while the outer die rotors 36, 37 are disposed in spaced relation to each other in such a manner that the molded metal plate 14 is not separated from the outer peripheral portion of the inner die rotor 30. The number and arrangement of the outer die rotors 33, 34, 35, 36, 37 are not limited to the shown example of this embodiment. Further, a cutter 38 for cutting the metal plate 14 is disposed in the neighborhood of the portion where the metal plate 14 is inserted.

In the continuous molding unit 15 configured as mentioned above, first, the forward end of the metal plate 14 is fixed at a position T on the outer periphery of the inner die rotor 30 corresponding to the end of the gap 23 of the support member 20 described with reference to FIGS. 5A, 5B and 6. With the rotation of the inner die rotor 30, the metal plate 14 is inserted between the outer die rotor 33 and the inner die rotor 30 and moves sequentially along the rotating outer die rotors 33, 34, 35. In the process of this movement, the metal plate 14 is formed into the shape of the outer peripheral portion of the inner die rotor 30 by the outer die rotors 33, 34, 35 in close contact with the outer periphery of the inner die rotor 30 under a predetermined pressure.

The metal plate 14 inserted into the continuous molding unit 15 is cut by the cutter 38 when the total length of the support member 20 described with reference to FIGS. 5A, 5B and 6 is reached. The inner die rotor 30 and the outer die rotors 33, 34, 35, 36, 37 of the continuous molding unit 15 may be widened so that a plurality of metal plates 14 cut to the width of the support member 20 may be mounted on the inner die rotor 30 thereby to mold a plurality of support members 20 at a time.

In the case where the support member 20 is formed in a press, on the other hand, the conventional practice is to fabricate a metal cylinder in advance and prepare two dies including an inner die and an outer die to be placed inside and outside the metal cylinder, respectively. The use of the continuous molding unit 15 described above which is used for molding the support member 20, however, eliminates the need of the outer die while at the same time making it possible to mold a support member continuously or to mold a plurality of support members at a time, thus reducing the production cost of the support member 20. Also, in the continuous molding unit 15 according to this embodiment, the metal plate 14 is held all the time by the outer die rotors 33, 34, 35, 36, 37 and the metal plate 14 is molded while being pressed against the outer peripheral surface of the inner die rotor 30, thus making accurate molding work possible.

Figure 9:
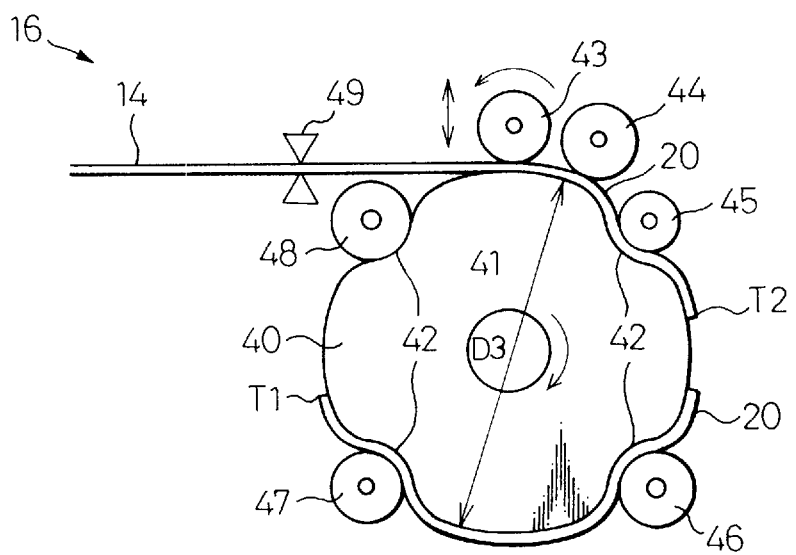
FIG. 9 is a diagram for explaining an example process of fabricating the support members described with reference to FIGS. 7A, 7B.

FIG. 9 is a diagram for explaining a general configuration of the continuous molding unit 16 according to an embodiment used for fabricating the support member 20 in the second embodiment described with reference to FIGS. 7A, 7B. In FIG. 9, numeral 40 designates an inner die rotor mounted on a rotative shaft 41. The inner die rotor 40 has a diameter D3 substantially equal to the inner diameter D1 of the support member 20 described with reference to FIGS. 7A, 7B. Recesses 42 of the same dimension and shape as the inner surface of the supporters 29 of the support member 20 described with reference to FIGS. 7A, 7B are formed at positions corresponding to the supporters 29 on the outer peripheral portion of the inner die rotor 40. The recesses 42 are smoothly connected to the outer peripheral portion of the inner die rotor 40

Also, according to this embodiment, six outer die rotors 43, 44, 45, 46, 47, 48 are disposed on the outer peripheral surface of the inner die rotor 40. These outer die rotors 43 to 48 have the rotative shafts thereof configured movably in radial direction from the inner die rotor 40 and are kept in close contact with the outer peripheral portion of the inner die rotor 40 under a predetermined pressure. These rotors 43 to 48 have such a diameter as to be rotated smoothly over the recesses of the metal plate 14 deformed along the recesses 42 of the inner die rotor 40.

Of these outer die rotors 43 to 48, the outer die rotors 43 to 45 are for molding the metal plate 14 and the outer die rotors 46 to 48 are used for holding the metal plate 14. Therefore, the outer die rotors 43 to 45 are concentrated at a portion where the thin metal plate 14 is inserted, while the outer die rotors 46 to 48 are disposed in spaced relation to each other in such a manner that the formed metal plate 14 is not separated from the outer peripheral portion of the inner die rotor 40. The number and arrangement of the outer die rotors 43 to 48 are not limited to those of the present embodiment. Further, a cutter 49 for cutting the metal plate 14 is disposed in the neighborhood of the portion where the metal plate 14 is inserted.

In the continuous molding unit 16 configured as described above, first, the forward end of the metal plate 14 is fixed at a position T1 on the outer periphery of the inner die rotor 40 corresponding to the end of the gap 23 of the support member 20 described with reference to FIGS. 7A, 7B. With the rotation of the inner die 40, the metal plate 14 is introduced between the outer die rotor 43 and the inner die rotor 40 and moves sequentially along the outer die rotors 43 to 45. In the process of this movement, the metal plate 14 is formed into the shape of the outer periphery of the inner die rotor 40 by means of the outer die rotors 43 to 45 kept in close contact with the outer periphery of the inner die rotor 40 under a predetermined pressure.

The metal plate 14 inserted into the continuous molding unit 16 is cut by the cutter 49 when it reaches the total length of the support member 20 described with reference to FIGS. 7A, 7B before a half rotation of the inner die rotor 40. The inner die rotor 40 stops upon making a half rotation, and the forward end of a new metal plate 14 is fixed at position T2 on the outer periphery of the inner die rotor 40 corresponding to the end position of the gap 24 of the support member 20 described with reference to FIGS. 7A, 7B. Then the inner die rotor 40 makes a another half rotation. In this way, a set of support members 20 are formed.

Also in this continuous molding unit 16, the inner die rotor 40 and the outer die rotors 43 to 48 may be widened to allow a plurality of metal plates 14 cut to the width of the support member 20 to be mounted in parallel on the inner die rotor 40 and thereby to mold a plurality of support members 20 at a time.

The continuous molding unit 16 shown in FIG. 9 performs an accurate molding operation with a less expensive support member 20 as does the continuous molding unit 15 described with reference to FIG. 8. Also, in the continuous molding unit 16, the short length of the molded support member 20 facilitates the removal of the support member 20 from the continuous molding unit 16. Further, in the case where the continuous molding unit 16 is configured in such a manner that as shown in FIG. 9 the metal plate 14 is inserted from above the inner die rotor 40 while the molded support member 20 is held under the inner die rotor 40, then the molded support member 20 is dropped under its weight by withdrawing the holding rollers 46, 47 from the outer periphery of the inner die rotor 40. The work of removing the support member 20 from the inner die rotor 40 thus can be saved for a further reduced production cost. Also, a configuration in which the molded support member 20 is dropped directly after being molded by means of the outer die rollers 43 to 45 eliminates the need of the outer die rotors 46 to 48.

Figure 10A:
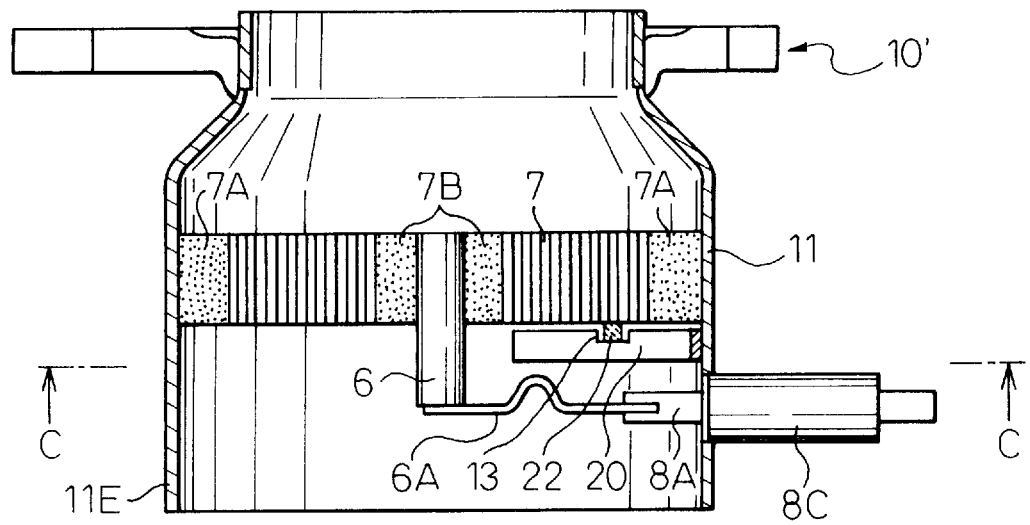
FIG. 10A is a sectional view showing a configuration of an electrically-heated catalyst apparatus according to a third embodiment of the invention.
Figure 10B:
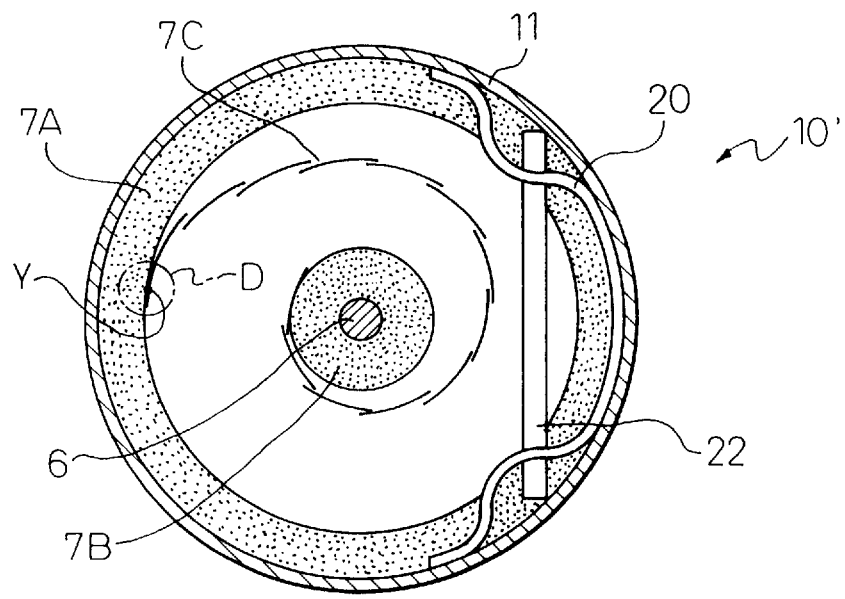
FIG. 10B is a sectional view taken in line C—C in FIG. 11A.

FIG. 10A is a sectional view showing a configuration of an electrically-heated catalyst apparatus 10' according to a third embodiment of the invention. FIG. 10B is a horizontal sectional view taken in line C—C in FIG. 10A. In these diagrams, the same component parts as those in the aforementioned embodiments are designated by the same reference numerals, respectively.

As shown in FIGS. 10A, 10B, a honeycomb unit 7 including a corrugated foil 4 and a tabular foil 5 accommodated in an outer metal cylinder 11 of the electrically-heated catalyst apparatus 10' is formed with reinforcements 7A, 7B respectively on the outer periphery and the outer periphery thereof, respectively. The structure of the reinforcements 7A, 7B is described above with reference to FIG. 3.

Also, according to the third embodiment, the central electrode 6 of the honeycomb unit 7 is protruded downstream of the exhaust gas flow. This embodiment is identical to the aforementioned embodiments in that the central electrode 6 is connected by means of a lead section 6A to an electrode section 8A formed through a holder 8C on the outer peripheral surface of the outer cylinder 11. In the third embodiment, the external electrode 8B, the battery 9 and the switch SW are not shown.

Figure 11:
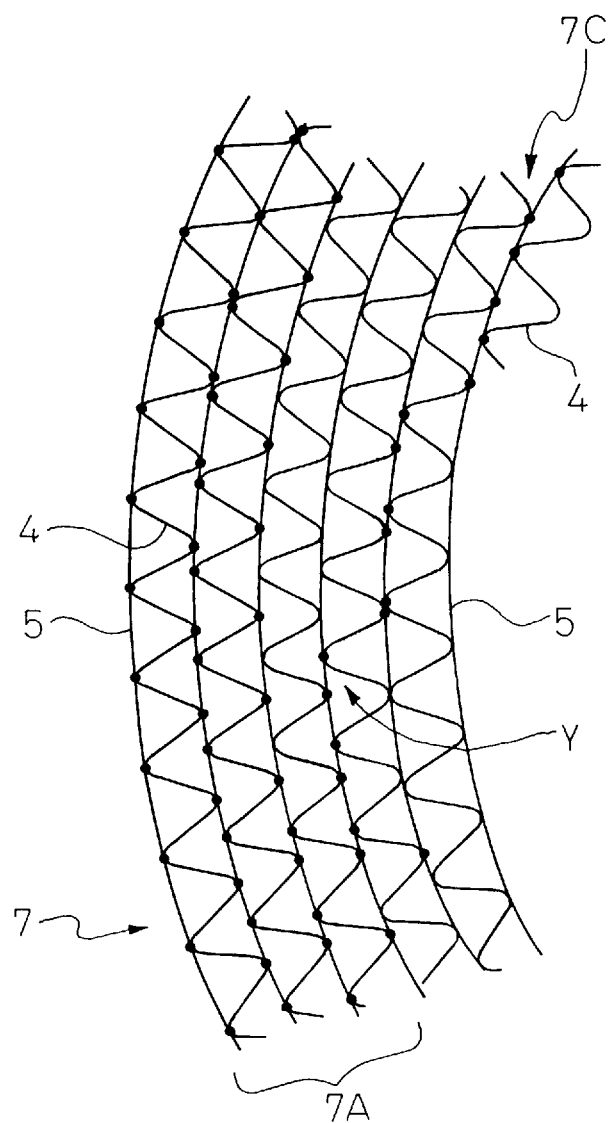
FIG. 11 is a partially enlarged view of the portion D in FIG. 10B.

Further, the electrically-heated catalyst apparatus 10' according to the third embodiment, as shown in FIG. 10B, is formed with a spirally-shaped heat-generating joint 7C with a smaller number of turns than the spiral structure of the honeycomb unit 7. The heat-generating joints 7C, which are directed toward the central electrode 6 of the honeycomb unit 7, are formed in the portions of the honeycomb unit 7 other than those formed with the reinforcements 7A, 7B. The heat-generating joints 7C, as shown in FIG. 11, are intended to weld a part of the contact portions between the corrugated foil 4 and the tabular foil 5 with a Ni solder material or the like, and current is concentrated on these particular portions for generating heat.

According to the third embodiment, the same members as the ceramic bars 22 which function as retainers and the support member 20 described with reference to FIGS. 7A, 7B are used to support the honeycomb unit 7 from the downstream side of the exhaust gas. In this embodiment, however, only one each of the ceramic bars 22 and the support members 20 are used, and are arranged at the tail end of the winding of the honeycomb unit 7 far from the starting point Y of the reinforcement 7A on the other side of the central electrode 6. According to the third embodiment, the starting point Y of the reinforcement 7A at the tail end of the winding of the honeycomb unit 7 constitutes an end of the heat-generating joint 7C nearer to the outer periphery of the honeycomb unit 7, as shown in FIG. 11.

The ceramic bar 22, as in the above-mentioned embodiments, can be arranged in such a position as to traverse the end surface of the honeycomb unit 7 downstream of the exhaust gas flow. In the process, the ceramics bar 22 is preferably arranged to traverse the end surface of the honeycomb unit 7 downstream of the exhaust gas flow far from the starting point Y of the reinforcement 7A in the direction perpendicular to a straight line connecting the starting point Y of the reinforcement 7A at the tail end of the winding of the honeycomb unit 7 and the center point of the central electrode 6 of the honeycomb unit 7.

The honeycomb unit 7, the ceramic bar 22 and the support member 20 are mounted on the electrically-heated catalyst apparatus 10' according to the third embodiment in the same manner as in the second embodiment.

In the electrically-heated catalyst apparatus 10' according to the third embodiment configured as described above, the outer peripheral portion and the inner peripheral portion of the honeycomb unit 7 are formed with the reinforcements 7A, 7B coupling the contact portions of the corrugated foil 4 and the tabular foil 5. Also, the ceramics bar 22 and the support member 20 are arranged only at the tail end of the winding of the honeycomb unit 7 far from the starting point Y of the reinforcement 7A on the other side of the center point of the honeycomb unit 7. As a consequence, the honeycomb unit 7 is prevented from telescoping, and at the same time only one each of the ceramic bars 22 and the support members 20 will do, thereby reducing both the weight and cost.

The ceramic bar 22 and the support member 20 can be arranged only at the tail end of the winding of the honeycomb unit 7 far from the starting point Y of the reinforcement 7A on the other side of the center point of the honeycomb unit 7 for the following reasons:

(1) The heat-generating joint 7C in contact with the outer peripheral reinforcement 7A, which is coupled by a solder material, is resistant to the telescoping (foil displacement), and therefore develops no telescoping even without the support by the ceramics bar 22 and the support member 20.

(2) Other portions, which are subjected only to the friction due to the tension generated when the corrugated foil 4 and the tabular foil 5 are wound in honeycomb fashion, are liable to develop telescoping, and therefore require the support of the ceramic bar 22 and the support member 20.

(3) the shearing force of the core (honeycomb unit) due to the exhaust gas flow increases toward the outer periphery.

(4) For the reasons mentioned in (1) to (3), telescoping is liable to occur with the outer peripheral reinforcement on the other side of the connection point of the heat-generating joint 7C to the outer peripheral reinforcement 7A.

Figure 12A:
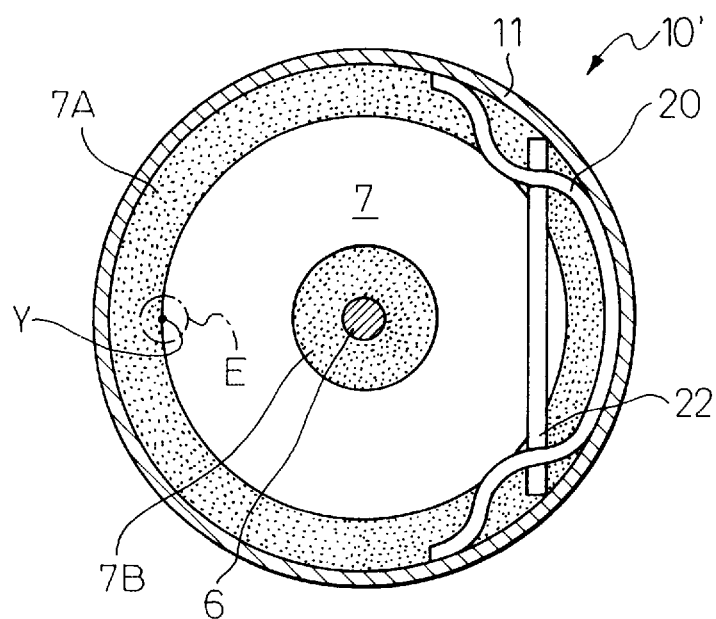
FIG. 12A is a sectional view of the same portion as FIG. 10B showing a modified configuration according to the third embodiment of the invention.
Figure 12B:
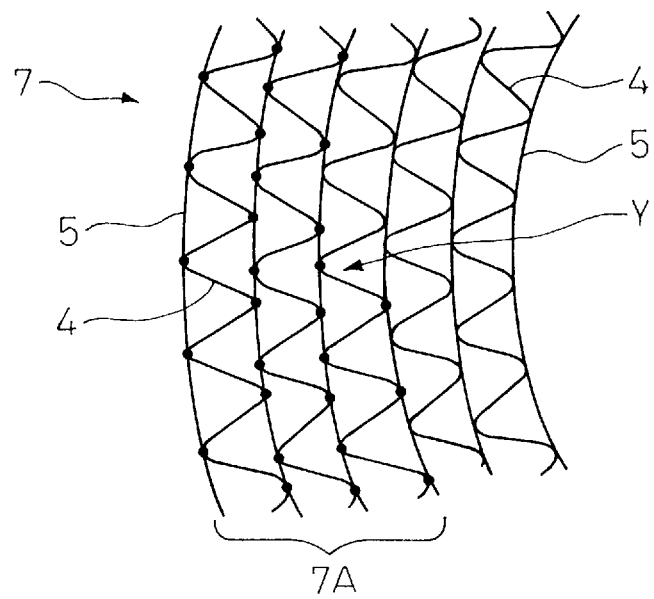
FIG. 12B is a partially enlarged view of the portion E in FIG. 12A.

FIG. 12A is a sectional view of the same portion as FIG. 10B showing a configuration of the electrically-heated catalyst apparatus 10' according to the third embodiment of the invention. FIG. 12B is an enlarged partial view of the portion E in FIG. 12A.

The electrically-heated catalyst apparatus 10' according to this modified embodiment is different from the third embodiment only in that the heat-generating joint 7C is not formed in the portions other than the reinforcements 7A, 7B on the outer periphery and the internal periphery of the honeycomb unit 7. The other configuration is exactly identical to that of the third embodiment. Therefore, the same component parts of the modified embodiment are designated by the same reference numerals as in the third embodiment and will not be described. In this modified embodiment, only one ceramic bar 22 and only one support member 20 are used, and are arranged also at the tail end of the winding of the honeycomb unit 7 far from the starting point Y of the reinforcement 7A on the other side of the central electrode 6 of the honeycomb unit 7. This modified embodiment has the same effect as the third embodiment.

Figure 13A:
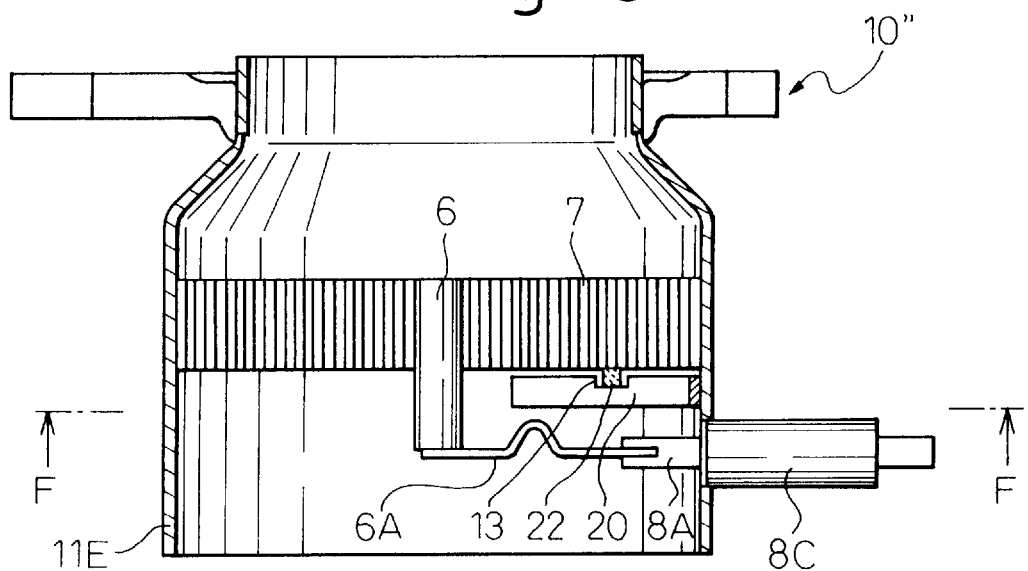
FIG. 13A is a sectional view showing a configuration of an electrically-heated catalyst apparatus according to a fourth embodiment of the invention.
Figure 13B:
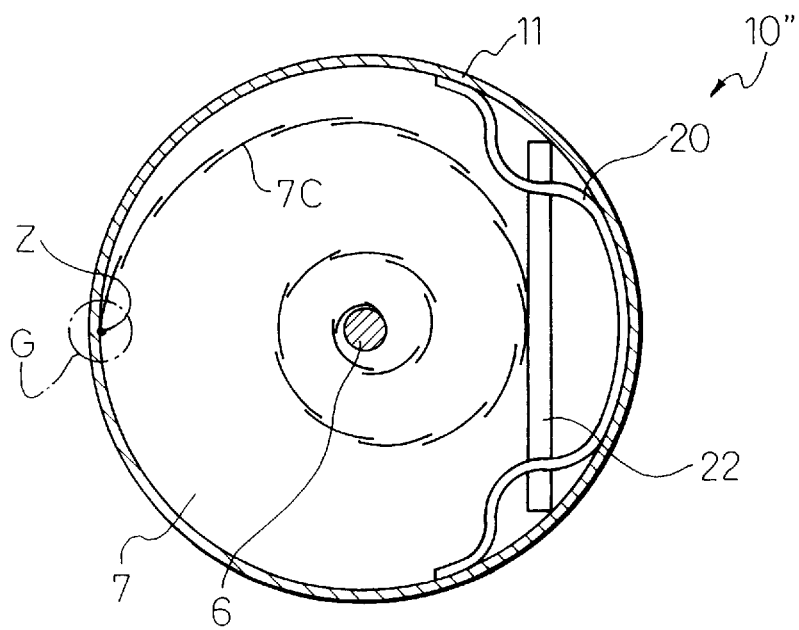
FIG. 13B is a sectional view taken in line F—F in FIG. 13A.
Figure 14:
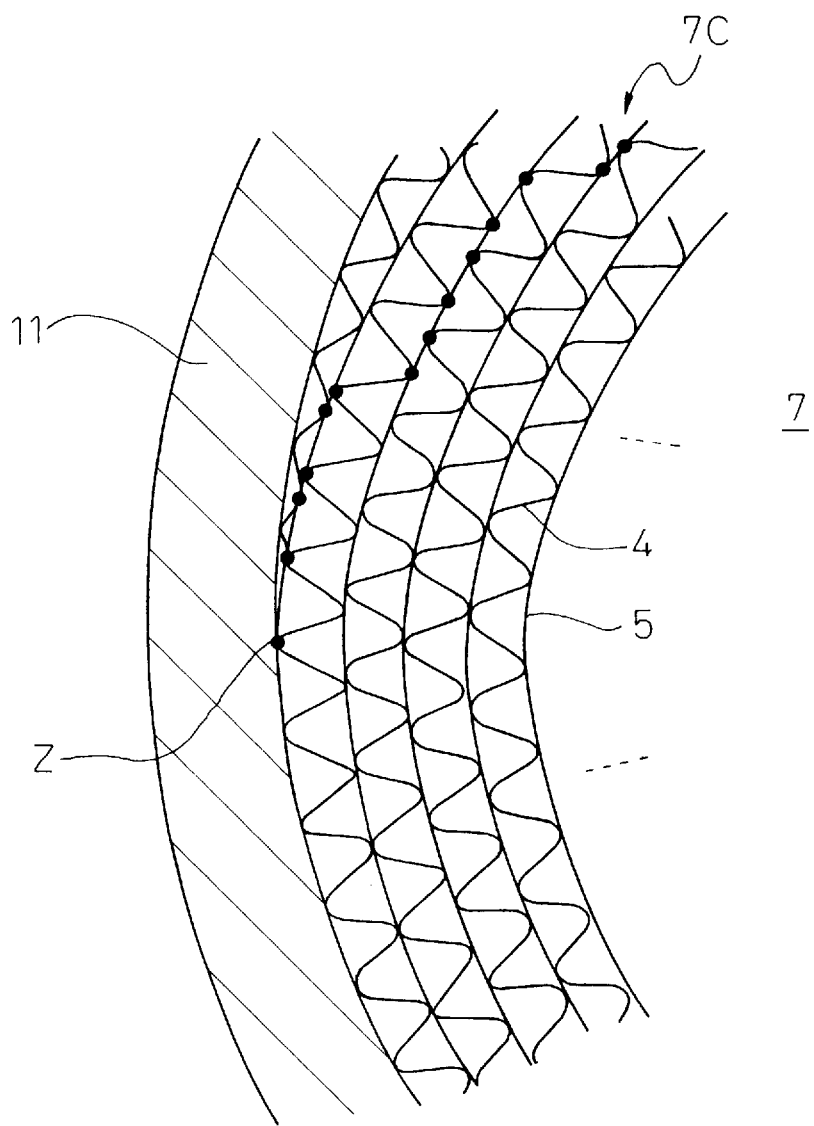
FIG. 14 is a partially enlarged view of the portion G in FIG. 13B.

FIG. 13A is a sectional view showing a configuration of the electrically-heated catalyst apparatus 10" according to a fourth embodiment of the invention. FIG. 13B is a sectional view taken in line F—F in FIG. 13A. Also, FIG. 14 is a partially enlarged view of the portion G in FIG. 13B. In the fourth embodiment, the component parts identical to those parts in the above-mentioned embodiments are designated by the same reference numerals, respectively. In the electrically-heated catalyst apparatus 10" according to the fourth embodiment, no reinforcement is provided on the outer peripheral surface and the inner peripheral surface of the honeycomb unit 7 configured of the corrugated foil 4 and the tabular foil 4 in the metal outer cylinder 11, as shown in FIGS. 13A, 13B. According to the fourth embodiment, on the other hand, a spiral chain of heat-generating joints 7C having a number of turns smaller than the spiral structure of the honeycomb unit 7 is formed toward the central electrode 6 from the tail end Z of the winding of the honeycomb unit 7 coupled by soldering to the metal outer cylinder 11. These heat-generating joints 7C are coupled by welding a part of the contact portions between the corrugated foil 4 and the tabular foil 5 by Ni solder or the like as shown in FIG. 14. Thus, heat is generated by concentrating the current in this part.

This embodiment is identical to the above-mentioned embodiments in that the central electrode 6 of the honeycomb unit 7 is protruded downstream of the exhaust gas flow, in that the central electrode 6 is connected by the lead section 6A to the electrode section 8A formed through the holder 8C disposed on the outer peripheral surface of the outer cylinder 11, and in that the honeycomb unit 7 is supported from the downstream side of the exhaust gas flow using one each of the ceramic bar 22 and the support member 20. Also in this embodiment, none of the external electrode 8B, the battery 9 and the switch SW is shown.

According to this fourth embodiment, the ceramic bar 22 and the support member 20 are arranged at a portion of the honeycomb unit 7 far from the tail end Z of the winding on the other side of the central electrode 6 of the honeycomb unit 7. The ceramic bar 22, as in the above-mentioned embodiments, can be arranged to traverse the end surface of the honeycomb unit 7 on the side thereof downstream of the exhaust gas flow. In the process, the ceramic bar 22 is preferably arranged in a direction perpendicular to a line connecting the tail end Z of the winding of the honeycomb unit 7 and the center of the central electrode 6 of the honeycomb unit 7. According to the fourth embodiment, the tail end Z of the winding of the honeycomb unit 7 constitutes the outer periphery-side end of the chain of heat-generating joints 7C, as shown in FIG. 14.

In the electrically-heated catalyst apparatus 10" according to the fourth embodiment having the above-mentioned configuration, the ceramics bar 22 and the support member 20 are arranged only at a portion of the honeycomb unit 7 far from the tail end Z of the winding on the other side of the center of the honeycomb unit 7. Therefore, only one each of the ceramic bar 22 and the support member 20 can prevent the honeycomb unit 7 from telescoping with a lower weight and cost.

Figure 15A:
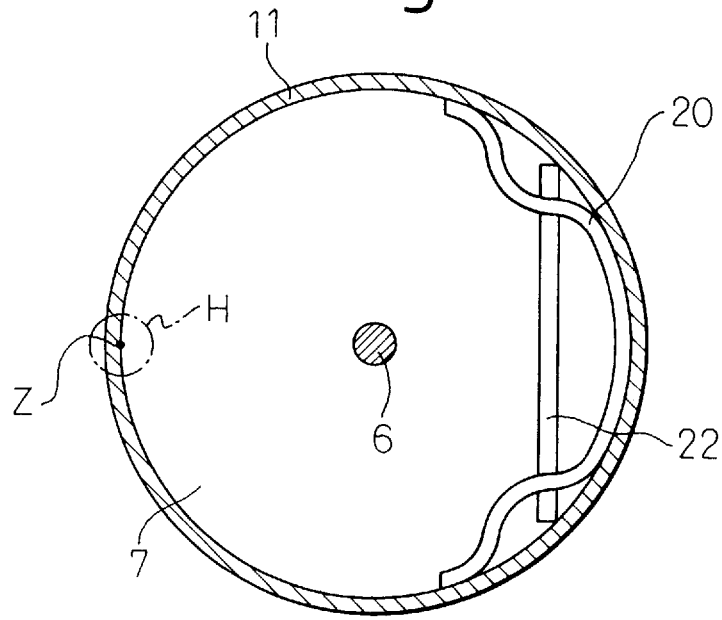
FIG. 15A is a sectional view of the same portion as FIG. 10B showing a modified configuration according to the fourth embodiment of the invention.
Figure 15B:
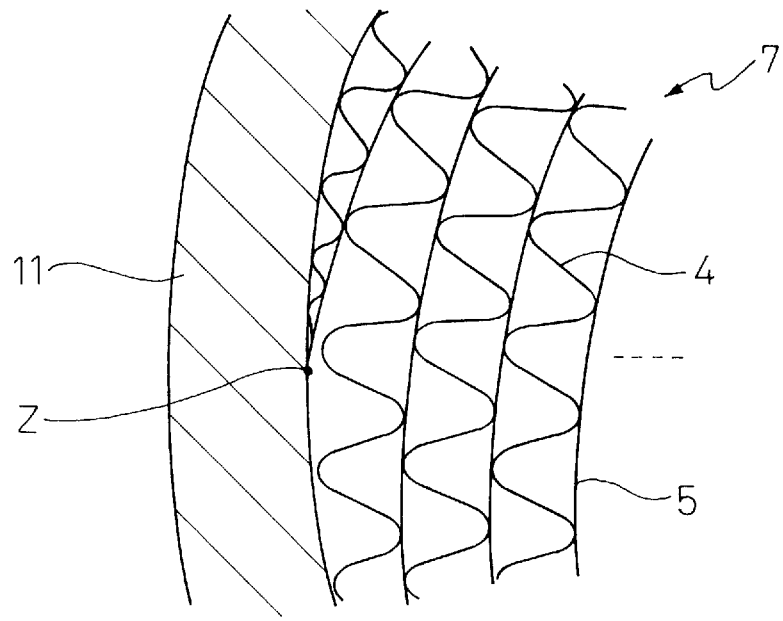
FIG. 15B is a partially enlarged view of the portion H in FIG. 15A.

FIG. 15A is a sectional view of the same portion as FIG. 13B showing a configuration of a modification of the fourth embodiment of the invention. FIG. 15B is a partially enlarged view of the portion H in FIG. 15A.

The electrically-heated catalyst apparatus 10" according to this modification is different from the fourth embodiment only in that the heat-generating joint 7C is not formed in the honeycomb unit 7. In this modification, the other configuration is exactly the same as the fourth embodiment, and the same component parts as those in the fourth embodiment are designated by the same reference numerals and will not be described. Therefore, this embodiment also employs one each of the ceramics bar 22 and the support member 20 which are arranged at the same portion far from the tail end Z of the winding of the honeycomb unit 7 on the other side of the central electrode 7 of the honeycomb unit 7. The tail end Z of the winding of the honeycomb unit 7 is shown in detail in FIG. 15B. This modification has the same effect as the fourth embodiment.

The above-mentioned embodiments refer to an electrically-heated catalyst apparatus containing the honeycomb unit 7 fabricated by winding the corrugated foil 4 and the tabular foil 5 superposed in a spiral form. The honeycomb unit 7 can alternatively be fabricated in cylindrical form by bending in zig-zag the corrugated foil 4 and the tabular foil 5 in superposed relation. The retainer and the support member according to the invention are effectively applicable also to an electrically-heated catalyst apparatus containing the honeycomb unit of this type.

It will thus be understood from the foregoing description that according to the present invention, there is provided an electrically-heated catalyst apparatus comprising a support member coupled to an outer cylinder for holding at least a retainer for preventing the electrically-heated catalyst moving backward, wherein a plurality of insulative retainers are arranged to prevent telescoping over a wide area of the honeycomb unit. Also, the support member of the retainer can be mounted on the outer cylinder along the internal geometry of the outer cylinder. As a result, a constant spacing is maintained between the support member and the outer cylinder for attaining a uniform heat propagation, so that the deformation of the support member under the effect of thermal stress is suppressed while at the same time preventing the retainer from coming off from the honeycomb unit.

Also, in the case where reinforcements are formed by coupling the contacts of the corrugated foil and the tabular foil in the outer peripheral portion and the inner peripheral portion of the honeycomb unit and at least a retainer is arranged at the tail end of the winding of the honeycomb unit far from the starting point of the reinforcement, then telescoping of the honeycomb unit can be prevented with a minimum number of the retainers and the support members at a reduced weight and a reduced cost.

What is claimed is:

1. An electrically heated catalyst apparatus contained in an outer metal cylinder, wherein an upstream end of the catalyst apparatus communicates with an exhaust manifold of an internal combustion engine so that exhaust gas from the engine flows through the catalyst apparatus from the upstream end to a downstream end thereof, the electrically heated catalyst apparatus comprising:

a cylindrical honeycomb unit contained in an outer metal cylinder, said honeycomb unit being formed of a metal foil laminate including a corrugated metal foil and a tabular metal foil;

a plurality of retainers of an insulating material traversing a downstream end surface of the honeycomb unit; and a support member for supporting the retainers, the support member being formed of a metal plate arranged downstream of the retainers and including a plurality of supporters for supporting ends of the retainers, wherein the support member is deformed so that an outer surface of the supporting member contacts an inner surface of the outer cylinder.

2. A support structure according to claim 1, wherein the support member is formed as at least a portion of a cylinder, the supporters are recessed diametrically inward from the cylinder of the support member, and wherein a gap is formed in an outer peripheral portion of the cylinder of the support member to render an outer periphery of support member discontinuous.

3. A support structure according to claim 1, wherein the support member is formed as at least a portion of a cylinder, the supporters are recessed diametrically inward from the cylinder of the support member, and wherein two gaps are formed in at least two outer peripheral portions of the cylinder of the support member to divide an outer periphery of support member into a plurality of independent support structures.

4. A support structure according to any one of claim 1, wherein the retainers are ceramic bars and each of the supporters has a plurality of slots for holding the ceramic bars, and wherein each of the length of each ceramic bar is determined so that, when each of the ceramic bars is suspended between a respective pair of slots, ends of the ceramic bars are spaced from the inner surface of the outer cylinder.

5. An apparatus according to claim 1, wherein the plurality of retainers comprises two retainers suspended between the supporters substantially parallel to each other.

6. An electrically heated catalyst apparatus contained in an outer metal cylinder, wherein an upstream end of the catalyst apparatus communicates with an exhaust manifold of an internal combustion engine so that exhaust gas from the engine flows through the catalyst apparatus from the upstream end to a downstream end thereof, the apparatus comprising:

a cylindrical honeycomb unit contained within an outer metal cylinder, the honeycomb unit being formed of a metal foil laminate including a corrugated metal foil and a tabular metal foil, wherein contact portions between the corrugated metal foil and the tabular metal foil are partially coupled to form a plurality of heat-generating joints arranged spirally from an outermost joint formed at an outer periphery of the honeycomb unit toward a center of the honeycomb unit;

an insulative retainer traversing a downstream end surface of the honeycomb unit, the retainer being positioned so that the center of the honeycomb unit is located between the retainer and the outermost of the heat-generating joints; and a support member for supporting the retainer, the support member being formed of a metal plate arranged downstream of the retainer and including a plurality of supporters for supporting ends of the retainer.

7. A supporting structure according to claim 6, wherein the honeycomb unit includes a plurality of reinforcements formed by an adhesive material applied between the corrugated metal foil and the tabular metal foil, and wherein the outermost heat generating joint is disposed on one of the reinforcements.

8. An apparatus according to claim 6, wherein the support member is formed as a part of a metal cylinder, and wherein the supporters are formed in a plurality of recessed outer peripheral portions of the support member.

9. An apparatus according to claim 6, wherein the retainer is a ceramic bar, and wherein each of the supporters includes a plurality of slots for holding the ceramic bar, and wherein the length of the ceramic bar is determined so that, when the ceramic bar is suspended between a respective pair of slots, ends of the ceramic bar are spaced from an inner surface of the outer cylinder.

* * * * *